(12) United States Patent
Chung et al.

(10) Patent No.: US 8,451,778 B2
(45) Date of Patent: May 28, 2013

(54) METHOD AND APPARATUS FOR TRANSMITTING CONTROL SIGNAL IN RADIO COMMUNICATION SYSTEM

(75) Inventors: Jae Hoon Chung, Anyang-si (KR); Jin Sam Kwak, Anyang-si (KR); Hyun Woo Lee, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 307 days.

(21) Appl. No.: 12/990,439

(22) PCT Filed: Apr. 30, 2009

(86) PCT No.: PCT/KR2009/002299
§ 371 (c)(1),
(2), (4) Date: Oct. 29, 2010

(87) PCT Pub. No.: WO2009/134094
PCT Pub. Date: Nov. 5, 2009

(65) Prior Publication Data
US 2011/0051671 A1 Mar. 3, 2011

Related U.S. Application Data

(60) Provisional application No. 61/048,953, filed on Apr. 30, 2008.

(51) Int. Cl.
*H04W 80/04* (2009.01)

(52) U.S. Cl.
USPC .......... 370/328; 370/208; 370/210; 370/329; 370/468; 370/470; 370/472; 370/473; 370/479

(58) Field of Classification Search
USPC ............... 370/208, 209, 210, 328, 329, 338, 370/468, 470, 472, 473, 474, 476, 477, 479; 375/130, 131, 140, 260, 267, 299, 346, 347
See application file for complete search history.

(56) References Cited

U.S. PATENT DOCUMENTS

| | | | | |
|---|---|---|---|---|
| 5,469,469 A * | 11/1995 | Haines | ...... | 375/131 |
| 6,091,760 A * | 7/2000 | Giallorenzi et al. | ...... | 375/140 |
| 6,515,980 B1 * | 2/2003 | Bottomley | ...... | 370/342 |
| 7,613,245 B2 * | 11/2009 | Cho et al. | ...... | 375/260 |
| 7,778,151 B2 * | 8/2010 | Bertrand et al. | ...... | 370/208 |
| 2006/0209739 A1 | 9/2006 | Kumar | | |
| 2006/0274710 A1 | 12/2006 | Lim | | |
| 2007/0097927 A1 * | 5/2007 | Gorokhov et al. | ...... | 370/335 |
| 2008/0051125 A1 | 2/2008 | Muharemovic | | |
| 2008/0075184 A1 * | 3/2008 | Muharemovic et al. | ...... | 375/260 |
| 2008/0090528 A1 * | 4/2008 | Malladi | ...... | 455/70 |

(Continued)

*Primary Examiner* — Ian N Moore
*Assistant Examiner* — Phong La
(74) *Attorney, Agent, or Firm* — McKenna Long & Aldridge LLP

(57) ABSTRACT

A method and an apparatus of transmitting a control signal in a wireless communication system is provided. They generate a first-spread sequence by spreading a modulated sequence in the first slot by using a first orthogonal sequence, generate a second-spread sequence by spreading a modulated sequence in the second slot by using a second orthogonal sequence. The first spread sequence and the second spread sequence are transmitted in a subframe. A length of the first orthogonal sequence is shorter than a length of the second orthogonal sequence, the second orthogonal sequence is generated by removing at least one element included in the first orthogonal sequence, and the at least one element to be removed is identical in every index of the first orthogonal sequence.

4 Claims, 12 Drawing Sheets

U.S. PATENT DOCUMENTS

| | | | |
|---|---|---|---|
| 2008/0165893 A1* | 7/2008 | Malladi et al. | 375/299 |
| 2008/0212464 A1* | 9/2008 | Kim et al. | 370/210 |
| 2008/0298502 A1* | 12/2008 | Xu et al. | 375/299 |
| 2008/0310547 A1* | 12/2008 | Tiirola et al. | 375/296 |
| 2008/0316957 A1* | 12/2008 | Shen et al. | 370/328 |
| 2009/0196229 A1* | 8/2009 | Shen et al. | 370/328 |
| 2010/0142475 A1* | 6/2010 | Kim et al. | 370/329 |
| 2011/0051671 A1* | 3/2011 | Chung et al. | 370/328 |
| 2011/0222393 A1* | 9/2011 | Kwak et al. | 370/208 |
| 2012/0076097 A1* | 3/2012 | Han et al. | 370/329 |
| 2012/0147821 A1* | 6/2012 | Bertrand et al. | 370/328 |

\* cited by examiner

FIG. 6
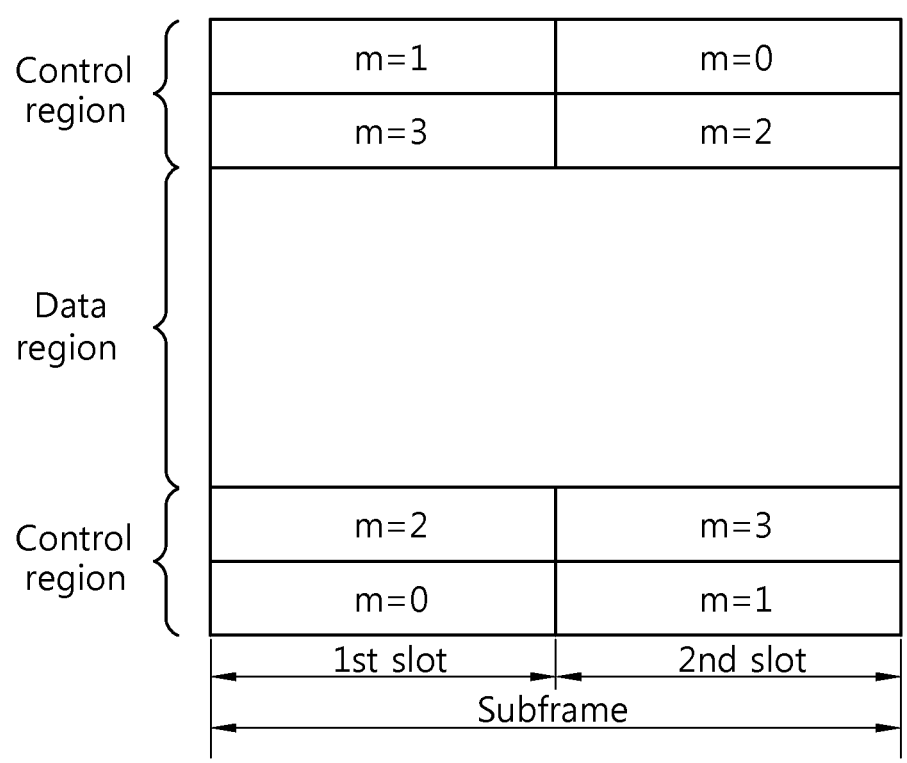
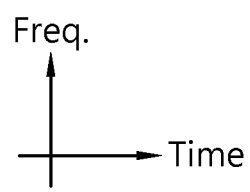

METHOD AND APPARATUS FOR TRANSMITTING CONTROL SIGNAL IN RADIO COMMUNICATION SYSTEM

This application is a 35 U.S.C. §371 National Stage entry of International Application No. PCT/KR2009/002299, filed on Apr. 30, 2009, and claims priority to U.S. Provisional Application No. 61/048,953, filed on Apr. 30, 2008, each of which is hereby incorporated by reference in its entirety as if fully set forth herein.

TECHNICAL FIELD

The present invention relates to wireless communications, and more particularly, to a method and apparatus for transmitting a control signal in a wireless communication system.

BACKGROUND ART

Wireless communication systems are widely spread all over the world to provide various types of communication services such as voice or data. In general, the wireless communication system is a multiple access system capable of supporting communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

SC-FDMA has almost the same complexity with OFDMA, and has a lower peak-to-average power ratio (PAPR) due to a single carrier property. Since the lower PAPR is advantageous to a user equipment in terms of transmit power efficiency, the SC-FDMA is adopted in uplink transmission in $3^{rd}$ generation partnership project (3GPP) long term evolution (LTE) as disclosed in the section 5 of 3GPP TS 36.211 V8.0.0 (2007-09) "Technical Specification Group Radio Access Network; Evolved Universal Terrestrial Radio Access (E-UTRA); Physical channels and modulation (Release 8)".

Meanwhile, various uplink control signals are transmitted through an uplink control channel. Examples of the uplink control signal include an acknowledgement (ACK)/not-acknowledgement (NACK) signal for performing hybrid automatic repeat request (HARQ), a channel quality indicator (CQI) for indicating downlink channel quality, a scheduling request (SR) for requesting resource allocation for uplink transmission, etc.

When an error occurs in transmission of the uplink control signal, the wireless communication system may experience overall performance deterioration, and thus the uplink control signal needs to be transmitted with high reliability. In order to improve system performance, there is a need for a method capable of effectively transmitting the uplink control signal.

DISCLOSURE

Technical Problem

The present invention provides a method and apparatus for transmitting a control signal by using an orthogonal sequence.

Technical Solution

In an aspect, a method of transmitting a control signal in a subframe comprising a first slot and a second slot in a time domain in a wireless communication system is provided. The method comprises generating a cyclically shifted sequence by cyclically shifting a base sequence by a cyclic shift amount, generating a modulated sequence on the basis of a modulation symbol representing the control signal and the cyclically shifted sequence, generating a first-spread sequence by spreading the modulated sequence in the first slot by using a first orthogonal sequence, generating a second-spread sequence by spreading the modulated sequence in the second slot by using a second orthogonal sequence and transmitting the first spread sequence and the second spread sequence in the subframe. A length of the first orthogonal sequence is shorter than a length of the second orthogonal sequence, the second orthogonal sequence is generated by removing at least one element included in the first orthogonal sequence, and the at least one element to be removed is identical in every index of the first orthogonal sequence.

The first orthogonal sequence is selected from sequences [+1 +1 +1 +1], [−1 +1 −1 +1], and [+1 −1 −1 +1] each of which has a length of 4, and the second orthogonal sequence is selected from sequences [+1 +1 +1], [−1 +1 −1], and [+1 −1 −1] each of which has a length of 3

The first orthogonal sequence is selected from sequences [−1 −1 +1 +1], [−1 +1 −1 +1], and [+1 −1 −1 +1] each of which has a length of 4, and the second orthogonal sequence is selected from sequences [−1 −1 +1], [−1 +1 −1], and [+1 −1 −1] each of which has a length of 3.

The control signal is an acknowledgement (ACK)/not-acknowledgement (NACK) signal for hybrid automatic repeat request (HARQ).

In another aspect, an apparatus for wireless communication comprises a radio frequency (RF) unit for transmitting a radio signal and a processor coupled to the RF unit, wherein the processor is configured for generating a cyclically shifted sequence by cyclically shifting a base sequence by a cyclic shift amount, generating a modulated sequence on the basis of a modulation symbol representing a control signal and the cyclically shifted sequence, generating a first-spread sequence by spreading the modulated sequence in a first slot by using a first orthogonal sequence, generating a second-spread sequence by spreading the modulated sequence in a second slot by using a second orthogonal sequence and transmitting the first spread sequence and the second spread sequence in the subframe that includes the first slo and the second slot, wherein a length of the first orthogonal sequence is shorter than a length of the second orthogonal sequence, the second orthogonal sequence is generated by removing at least one element included in the first orthogonal sequence, and the at least one element to be removed is identical in every index of the first orthogonal sequence.

Advantageous Effects

System performance can be improved by increasing reliability on transmission of an uplink control signal.

DESCRIPTION OF DRAWINGS

FIG. 6 shows a structure of a UL subframe.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE.

For clarity of explanation, the following description will focus on the 3GPP LTE/LTE-A. However, technical features of the present invention are not limited thereto.

Figure 1:
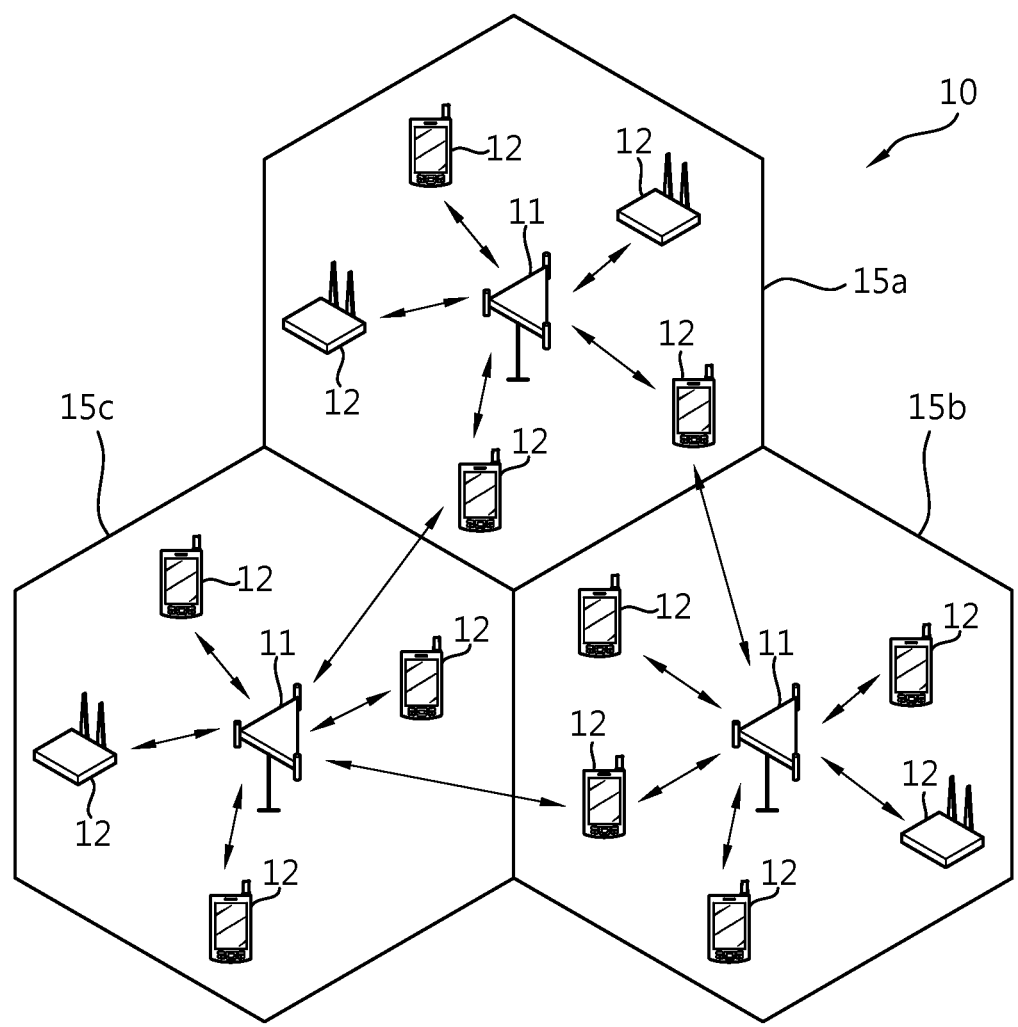
FIG. 1 shows a wireless communication system.

FIG. 1 shows a wireless communication system. A wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) implies communication from the BS to the UE, and an uplink (UL) implies communication from the UE to the BS. In the DL, a transmitter may be a part of the BS, and a receiver may be a part of the UE. In the UL, the transmitter may be a part of the UE, and the receiver may be a part of the BS.

The wireless communication system can support UL and/or DL hybrid automatic repeat request (HARQ). In addition, a channel quality indicator (CQI) can be used for link adaptation.

Figure 2:
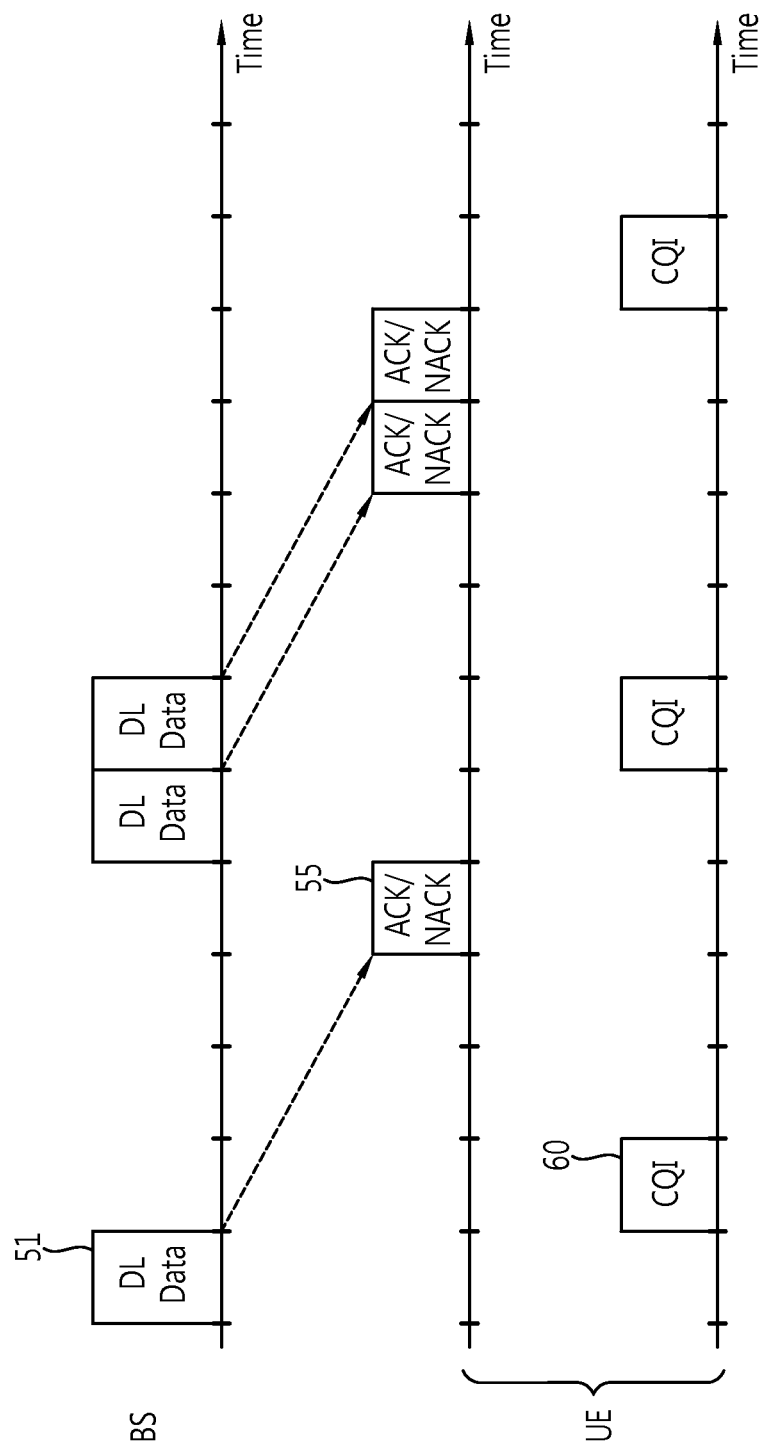
FIG. 2 shows DL HARQ and CQI transmission.

FIG. 2 shows DL HARQ and CQI transmission. Upon receiving DL data 51 from a BS, a UE transmits an acknowledgement (ACK)/not-acknowledgement (NACK) signal 55 for HARQ after a specific time elapses. The ACK/NACK signal 55 corresponds to an ACK signal when the DL data is successfully decoded, and corresponds to a NACK signal when the DL data fails in decoding. Upon receiving the NACK signal, the BS can transmit the DL data until the ACK signal is received or until retransmission is performed up to a maximum number of retransmission attempts. A transmission time of the ACK/NACK signal 55 for the DL data 51 or resource allocation can be dynamically reported by the BS by using signaling, or can be pre-agreed according to the transmission time of the DL data or the resource allocation. For example, when the DL data 51 is received in an $n^{th}$ subframe, the UE can feed back the ACK/NACK signal in an $(n+4)^{th}$ subframe.

The UE may measure a DL channel state and report a CQI 60 to the BS periodically and/or non-periodically. The BS may use the CQI 60 in DL scheduling. The BS may report information on a transmission time of the CQI 60 or resource allocation to the UE.

Figure 3:
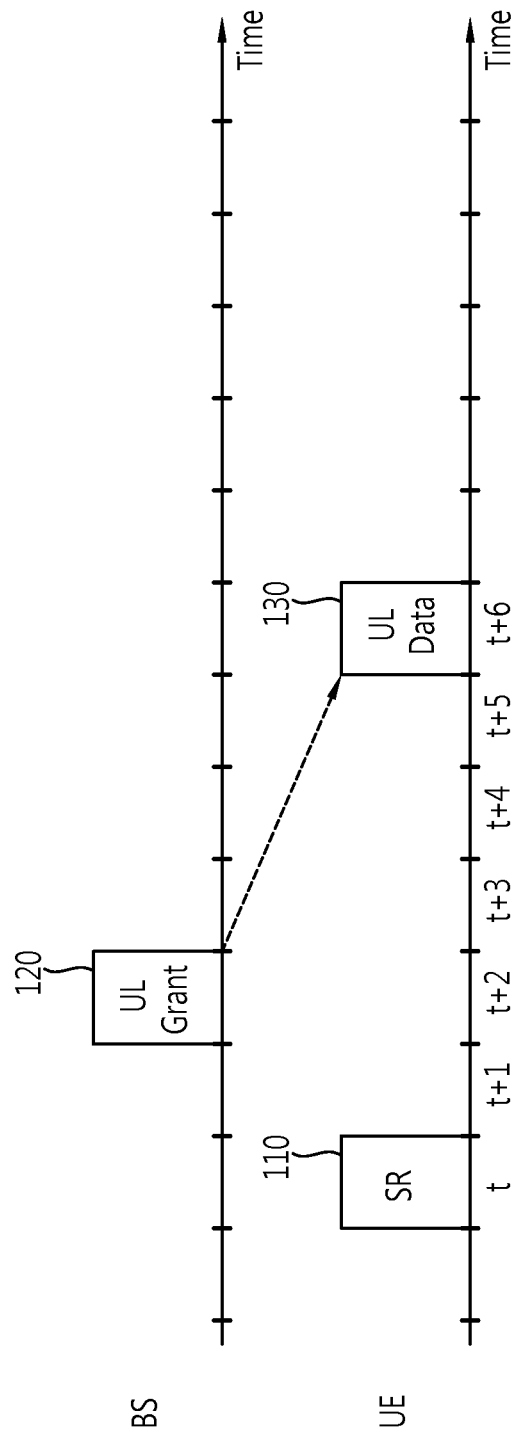
FIG. 3 shows UL transmission.

FIG. 3 shows UL transmission. For the uplink transmission, a UE first transmits a scheduling request (SR) 110 to a BS. The SR 110 is used when the UE requests the BS to allocate UL radio resources, and is a sort of preliminary information exchange for data exchange. In order for the UE to transmit UL data 130 to the BS, the UE firsts requests allocation of the radio resources by using the SR 110.

In response to the SR 110, the BS sends a UL grant 120 to the UE. The UL grant 120 includes information on UL radio resource allocation. The UE transmits UL data 130 by using the allocated UL radio resource.

As shown in FIG. 2 and FIG. 3, the UE can transmit a UL control signal such as an ACK/NACK signal, a CQI, and an SR in a given subframe. A type or size of the control signal may vary depending on a system, and technical features of the present invention are not limited thereto.

Figure 4:
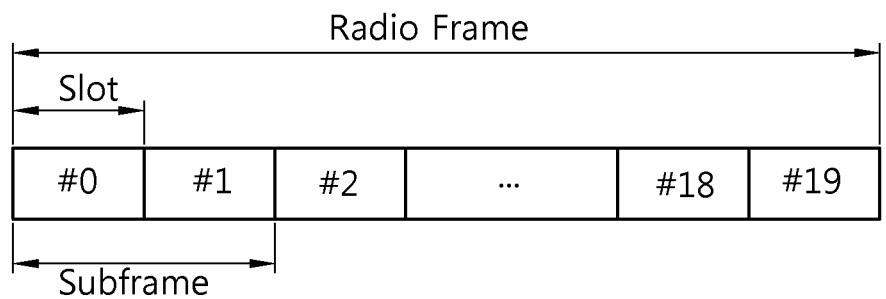
FIG. 4 shows a structure of a radio frame in 3GPP LTE.

FIG. 4 shows a structure of a radio frame in 3GPP LTE. The radio frame consists of 10 subframes. One subframe consists of 2 slots. A time required for transmitting one subframe is defined as a transmission time interval (TTI). For example, one subframe may have a length of 1 millisecond (ms), and one slot may have a length of 0.5 ms.

One slot includes a plurality of SC-FDMA symbols in a time domain and includes a plurality of resource blocks (RBs) in a frequency domain. Since 3GPP LTE uses SC-FDMA in UL, the SC-FDMA symbol is for representing one symbol period, and can be referred to as an OFDMA symbol or a symbol period according to a system. The RB includes a plurality of contiguous subcarriers in one slot in a resource allocation unit.

The structure of the radio frame is for exemplary purposes only, and the number of subframes included in the radio frame or the number of slots included in the subframe and the number of SC-FDMA symbols included in the slot can change variously.

Figure 5:
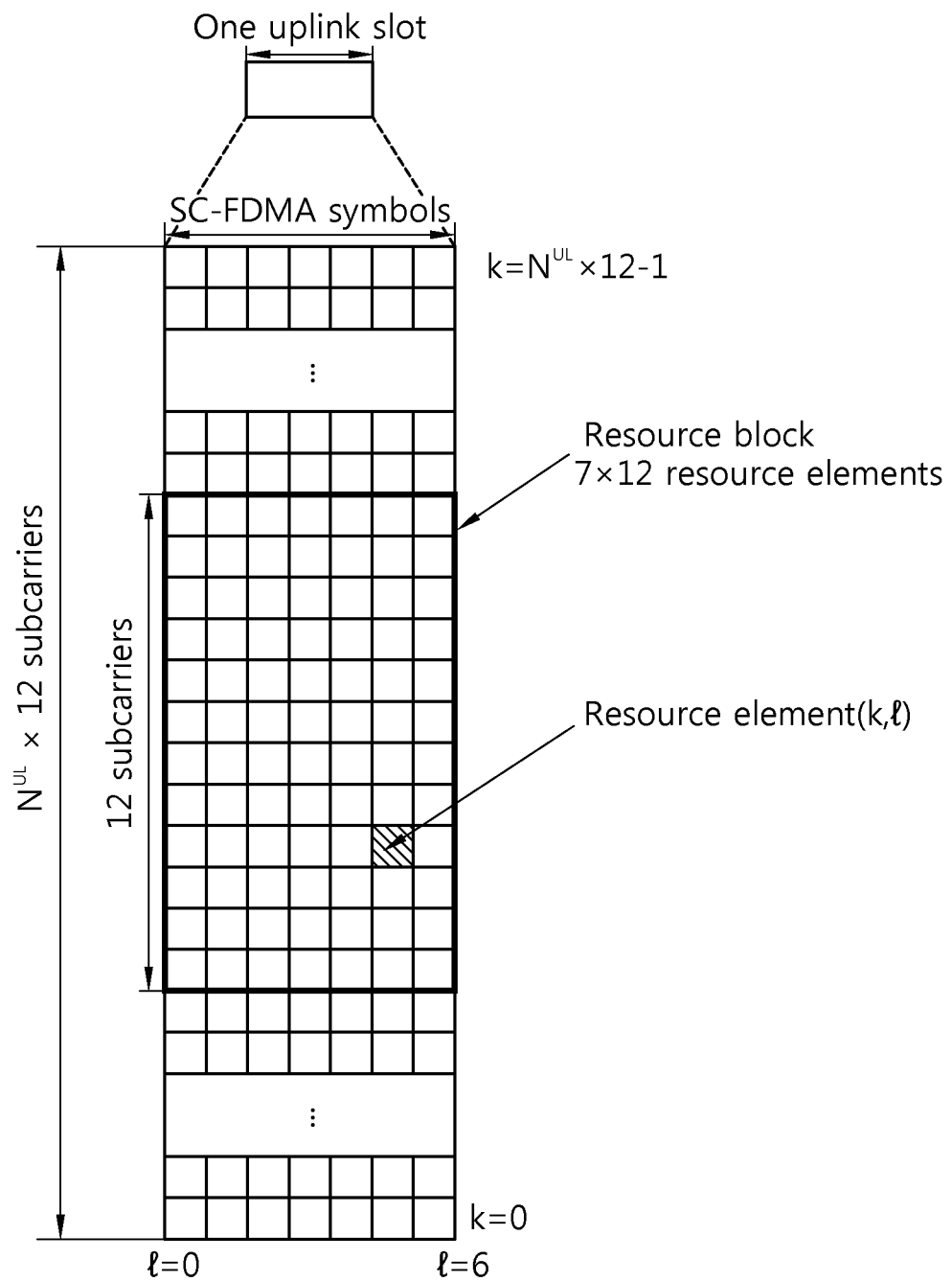
FIG. 5 is a diagram showing an example of a resource grid for one UL slot.

FIG. 5 is a diagram showing an example of a resource grid for one UL slot. The UL slot includes a plurality of SC-FDMA symbols in a time domain and includes a plurality of RBs in a frequency domain. Although it is described herein that one UL slot includes 7 SC-FDMA symbols and one RB includes 12 subcarriers, the present invention is not limited thereto. The number $N^{UL}$ of RBs included in the UL slot depends on a UL bandwidth defined in a cell.

Each element on the resource grid is referred to as a resource element. One RB includes 12×7 resource elements. The resource element on the resource grid can be identified by an index pair (k, l) within the slot. Herein, $k(k=0, \ldots, N^{UL} \times 12-1)$ denotes a subcarrier index in the frequency domain, and $l(l=0, \ldots, 6)$ denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

FIG. 6 shows a structure of a UL subframe. The UL subframe can be divided into a control region and a data region in a frequency domain. The control region is allocated with a physical uplink control channel (PUCCH) for carrying UL control information. The data region is allocated with a physical uplink shared channel (PUSCH) for carrying user data. To maintain a single carrier property, one UE may not simultaneously transmit the PUCCH and the PUSCH.

The PUCCH for one UE is allocated in an RB pair. RBs belonging to the RB pair occupy different subcarriers in each of two slots. This is called that the RB pair allocated to the PUCCH is frequency-hopped in a slot boundary. m is a location index indicating a frequency-domain location of an RB allocated to the PUCCH in the subframe. In the figure, the PUCCH is configured through a region having the same m in the control region included in the subframe, and one PUCCH occupies different frequency regions in a $1^{st}$ slot and a $2^{nd}$ slot.

The PUCCH can support multiple formats. That is, a UL control signal having a different number of bits for each subframe can be transmitted according to a modulation scheme. For example, when using binary phase shift keying (BPSK), a 1-bit UL control signal can be transmitted through the PUCCH, and when using quadrature phase shift keying (QPSK), a 2-bit UL control signal can be transmitted through the PUCCH.

Now, transmission of a control signal through a PUCCH will be described.

The control signal can be transmitted using a cyclically shifted sequence. The cyclically shifted sequence can be generated by cyclically shifting a base sequence by a specific cyclic shift (CS) amount. Various types of sequences can be used as the base sequence. For example, a well-known sequence such as a pseudo noise (PN) sequence and a Zadoff-Chu (ZC) sequence can be used as the base sequence. Alternatively, when one RB includes 12 sub-carriers, the following sequence having a length of 12 can be used as the base sequence.

$$r_i(n)=e^{jb(n)\pi/4}$$ [Equation 1]

Herein, i∈ {0, 1, ..., 29} denotes a root index, and n denotes an element index in the range of 0≦n≦N−1, where N is a sequence length. A different base sequence is defined according to a different root index. When N=12, b(n) can be defined by the following Table.

TABLE 1

| i | b(0), ..., b(11) | | | | | | | | | | | |
|---|---|---|---|---|---|---|---|---|---|---|---|---|
| 0 | −1 | 1 | 3 | — | 3 | 3 | 1 | 1 | 3 | 1 | — | 3 |
| 1 | 1 | 1 | 3 | 3 | 3 | — | 1 | — | — | 1 | — | 3 |
| 2 | 1 | 1 | — | — | — | — | — | 1 | — | 1 | −1 |
| 3 | −1 | 1 | 1 | 1 | 1 | — | — | — | 1 | — | 3 | −1 |
| 4 | −1 | 3 | 1 | — | 1 | — | — | — | 1 | — | 1 | 3 |
| 5 | 1 | — | 3 | — | — | 1 | 1 | — | — | 3 | — | 1 |
| 6 | −1 | 3 | — | — | — | 3 | 1 | — | 3 | 3 | — | 1 |

TABLE 1-continued

| i | b(0), ..., b(11) | | | | | | | | | | | |
|---|---|---|---|---|---|---|---|---|---|---|---|---|
| 7 | −3 | — | — | — | 1 | — | 3 | — | 1 | — | 3 | 1 |
| 8 | 1 | — | 3 | 1 | — | — | — | 1 | 1 | 3 | — | 1 |
| 9 | 1 | — | — | 3 | 3 | — | — | 1 | 1 | 1 | 1 | 1 |
| 10 | −1 | 3 | — | 1 | 1 | — | — | — | — | — | 3 | −1 |
| 11 | 3 | 1 | — | — | 3 | 3 | — | 1 | 3 | 1 | 3 | 3 |
| 12 | 1 | — | 1 | 1 | — | 1 | 1 | 1 | — | — | — | 1 |
| 13 | 3 | 3 | — | 3 | — | 1 | 1 | 3 | — | — | 3 | 3 |
| 14 | −3 | 1 | — | — | — | 3 | 1 | 3 | 3 | 3 | — | 1 |
| 15 | 3 | — | 1 | — | — | — | 1 | 1 | 3 | 1 | — | −3 |
| 16 | 1 | 3 | 1 | — | 1 | 3 | 3 | 3 | — | — | 3 | −1 |
| 17 | −3 | 1 | 1 | 3 | — | 3 | — | — | 3 | 1 | 3 | −1 |
| 18 | −3 | 3 | 1 | 1 | — | 1 | — | — | — | — | 1 | −3 |
| 19 | −1 | 3 | 1 | 3 | 1 | — | — | 3 | — | — | — | −1 |
| 20 | −1 | — | 1 | 1 | 1 | 1 | 3 | 1 | — | 1 | — | −1 |
| 21 | −1 | 3 | — | 1 | — | — | — | — | — | 1 | — | −3 |
| 22 | 1 | 1 | — | — | — | — | — | 3 | — | 1 | — | 3 |
| 23 | 1 | 1 | — | — | — | — | 1 | — | 1 | 3 | — | 1 |
| 24 | 1 | 1 | 3 | 1 | 3 | 3 | — | 1 | — | — | — | 1 |
| 25 | 1 | — | 3 | 3 | 1 | 3 | 3 | 1 | — | — | — | 3 |
| 26 | 1 | 3 | — | — | 3 | — | 1 | — | — | 3 | — | −3 |
| 27 | −3 | — | — | — | — | 3 | 1 | — | 1 | 3 | — | −3 |
| 28 | −1 | 3 | — | 3 | — | 3 | 3 | — | 3 | 3 | — | −1 |
| 29 | 3 | — | — | — | — | — | — | 3 | — | 3 | 1 | −1 |

A base sequence r(n) can be cyclically shifted as follows.

$$r(n,a)=r((n+a)\bmod N), \text{for } n=0,\ldots,N-1$$ [Equation 2]

Herein, 'a' denotes a CS amount, and 'mod' denotes a modulo operation. The number of available CSs varies depending on a CS unit. If the CS is possible in a unit of one subcarrier (or one element), 'a' can be any value in the range of 0 to N−1, and the number of available CSs is N. Alternatively, if the CS is possible in a unit of 2 subcarriers, 'a' can be any value of {0, 2, 4, ..., N−1}, and the number of available CSs is N/2.

Hereinafter, the available CS of the base sequence denotes a CS that can be derived from the base sequence according to a CS unit. For example, if the base sequence has a length of 12 and the CS unit is 1, the total number of available CSs of the base sequence is 12. Alternatively, if the base sequence has a length of 12 and the CS unit is 6, the total number of available CSs of the base sequence is 6.

Figure 7:
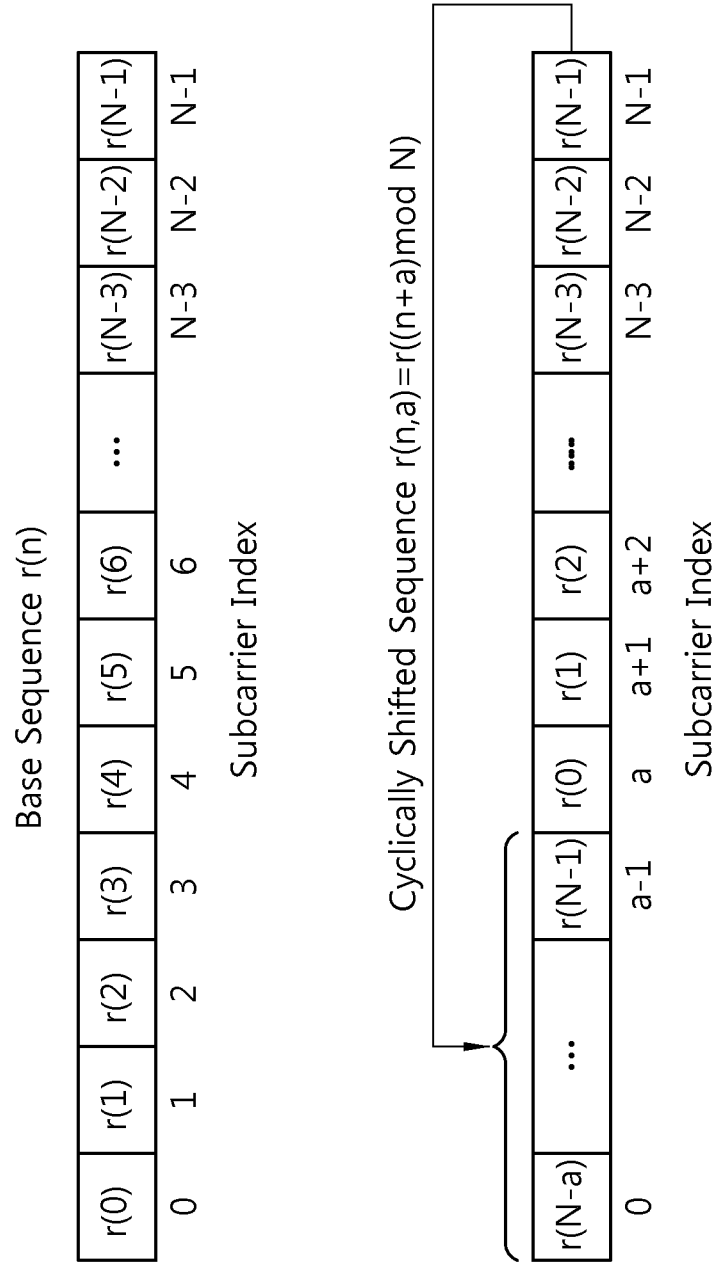
FIG. 7 shows a base sequence r(n) and a cyclically shifted sequence r(n, a).

FIG. 7 shows a base sequence r(n) and a cyclically shifted sequence r(n, a). A base sequence r(0) having a length of N consists of N elements from r(0) to r(N−1). The cyclically shifted sequence r(n, a) is generated by cyclically shifting N elements from r(0) to r(N−1) by a CS amount 'a'. That is, r(0) to r(N−a−1) are mapped from a subcarrier index 'a', and r(N−a) to r(N−1) are shifted to a first part of the cyclically shifted sequence r(n. a).

Figure 8:
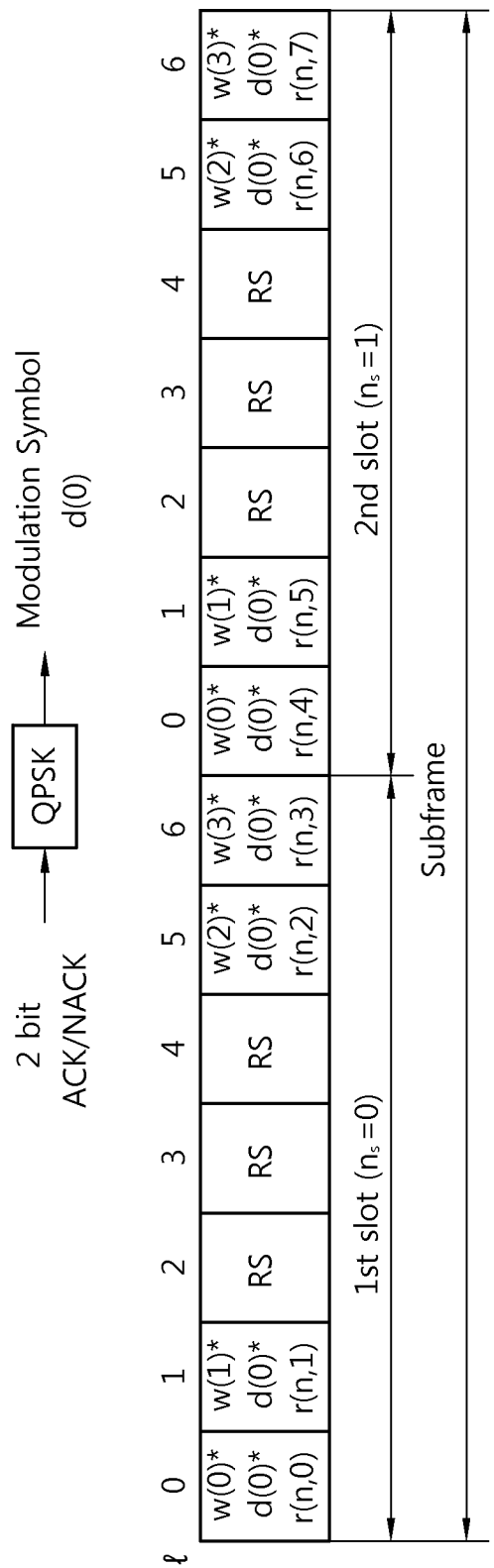
FIG. 8 shows a PUCCH structure used in transmission of an ACK/NACK signal when using a normal CP.

FIG. 8 shows a PUCCH structure used in transmission of an ACK/NACK signal when using a normal CP. Among 7 SC-FDMA symbols included in one slot, a reference signal (RS) is carried on 3 SC-FDMA symbols, and the ACK/NACK signal is carried on the remaining 4 SC-FDMA symbols. The RS is carried on 3 contiguous SC-FDMA symbols. In this case, the location and the number of symbols used in the RS may vary, and accordingly, the location and the number of symbols used in the ACK/NACK signal may also vary.

To transmit the ACK/NACK signal, a 2-bit ACK/NACK signal is QPSK-modulated to generate one modulation symbol d(0). A modulated sequence m(n) is generated based on the modulation symbol d(0) and the cyclically shifted sequence r(n, a). The cyclically shifted sequence r(n, a) is multiplied by the modulation symbol to generate the following modulated sequence m(n).

$$m(n)=d(0)r(n,a)$$ [Equation 3]

A CS amount of the cyclically shifted sequence r(n, a) may vary for each SC-FDMA symbol or may be identical in each SC-FDMA symbol. Although it is described herein that a CS amount 'a' is set to 0, 1, 2, and 3 sequentially for 4 SC-FDMA symbols in one slot, this is for exemplary purposes only.

In addition, to increase a UE capacity, the modulated sequence can be spread by using an orthogonal sequence for each slot. Herein, it is shown that a modulated sequence y(n) is spread by using an orthogonal sequence $w_i(k)$ which has a spreading factor K=4 for 4 SC-FDMA symbols on which a control signal is carried in each slot.

The following sequence can be used based on the orthogonal sequence $w_i(k)$ (where i is a sequence index and $0 \leq k \leq K-1$) of the spread factor K=4.

TABLE 2

| Sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

An ACK/NACK signal is not limited to 2 bits, and thus may consist of 1 bit or more bits. A modulation scheme is not limited to QPSK, and thus BPSK or a higher-order modulation scheme can also be used. For example, one modulation symbol is generated using BPSK modulation for a 1-bit ACK/NACK signal, and a modulated sequence can be generated based on a modulation symbol and a cyclically shifted sequence.

An RS can be generated based on an orthogonal sequence and a cyclically shifted sequence generated from the same base sequence as the ACK/NACK signal. That is, the cyclically shifted sequence can be used as the RS by spreading it using the orthogonal sequence $w_i(k)$ having a spread factor K=3. For the spread of the RS transmitted across 3 SC-FDMA symbols, the following sequence can be used as the orthogonal sequence $w_i(k)$ having the spread factor K=3 (where i is a sequence index and $0 \leq k \leq K-1$).

TABLE 3

| Sequence index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Meanwhile, the same structure as the PUCCH for transmission of the ACK/NACK signal can be used for SR transmission. Since an SR can be known only by the presence/absence of PUCCH transmission, a specific value, e.g., d(0)=1, can be used as the modulation symbol. The BS can distinguish the SR or the ACK/NACK signal by using a CS index of the base sequence. That is, when using a sequence cyclically shifted by a CS allocated for the SR, transmission of the SR is recognized, and when using a sequence cyclically shifted by a CS allocated for the ACK/NACK signal, the ACK/NACK signal is recognized.

Figure 9:
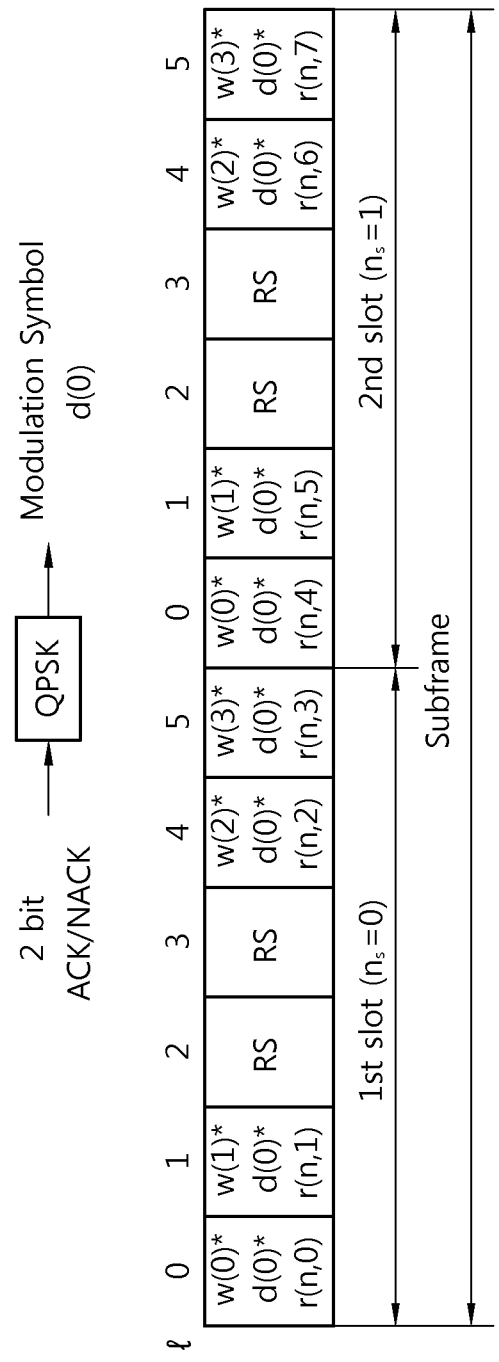
FIG. 9 shows a PUCCH structure used in transmission of an ACK/NACK signal when using an extended CP.

FIG. 9 shows a PUCCH structure used in transmission of an ACK/NACK signal when using an extended CP. Each of a $1^{st}$ slot and a $2^{nd}$ slot includes 6 SC-FDMA symbols. Among the 6 SC-FDMA symbols of each slot, an RS is carried on 2 SC-FDMA symbols, and a control signal is carried on the remaining 4 SC-FDMA symbols. The control signal is spread through an orthogonal sequence having a length of 4, and the RS is spread through an orthogonal sequence having a length of 2.

The PUCCH structure configured as shown in FIG. 8 and FIG. 9 does not consider a case where at least one SC-FDMA symbol is punctured. For example, transmission of a sounding reference signal (SRS) is taken into account. The SRS is a reference signal transmitted by a UE to a BS for UL scheduling. By distinguishing from the SRS, a reference signal used to demodulate a control signal or data on the PUCCH or PUSCH is referred to as a demodulation (DM) reference signal. Hereinafter, the reference signal is the DM reference signal unless otherwise specified.

Figure 10:
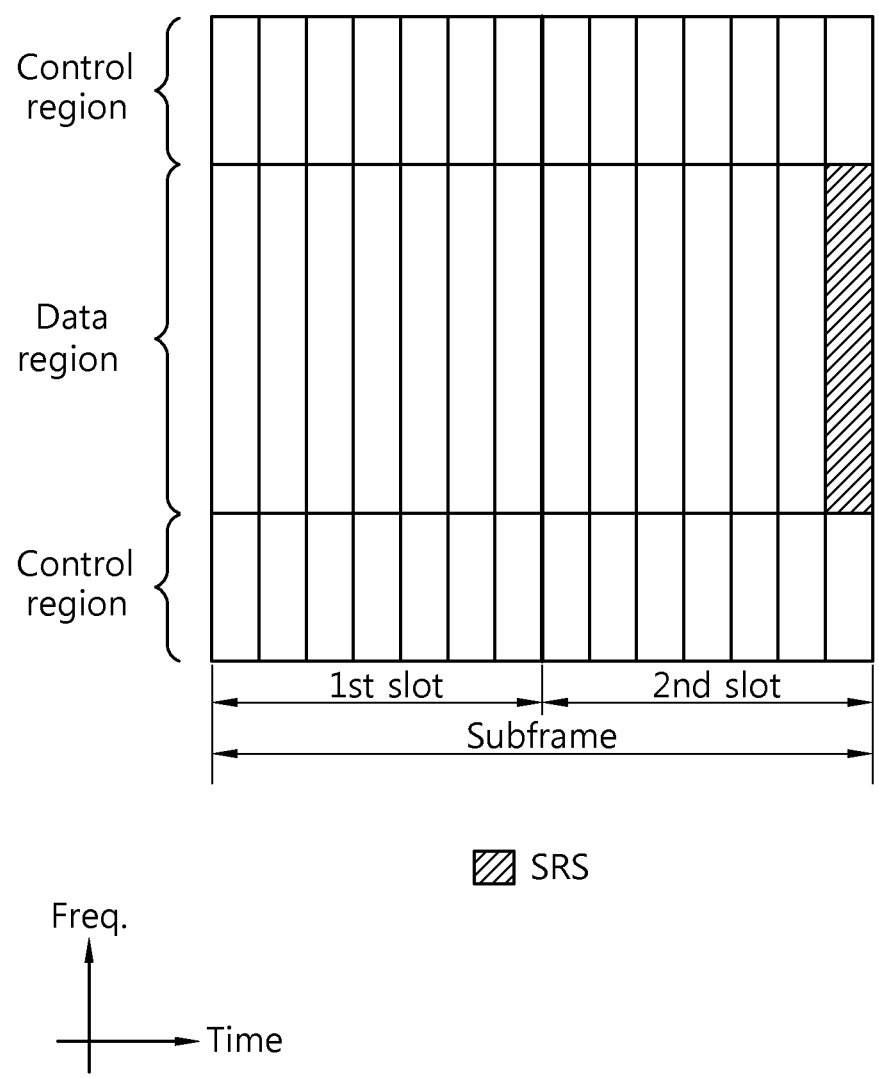
FIG. 10 shows transmission of an SRS in a subframe.

FIG. 10 shows transmission of an SRS in a subframe. The SRS is transmitted in a last SC-FDMA symbol of the subframe. In this case, the last SC-FDMA symbol used in transmission of the SRS is punctured in the PUCCH structure. An SC-FDMA symbol on which the SRS is transmitted is referred to as a sounding symbol. Herein, a last SC-FDMA symbol among 14 SC-FDMA symbols constituting the subframe is a sounding symbol, but this is for exemplary purposes only, and thus the location and the number of sounding symbols in the subframe can change variously. The SRS may be transmitted across a full band or may be transmitted in some parts of the full band. A UE can transmit the SRS periodically or non-periodically.

Figure 11:
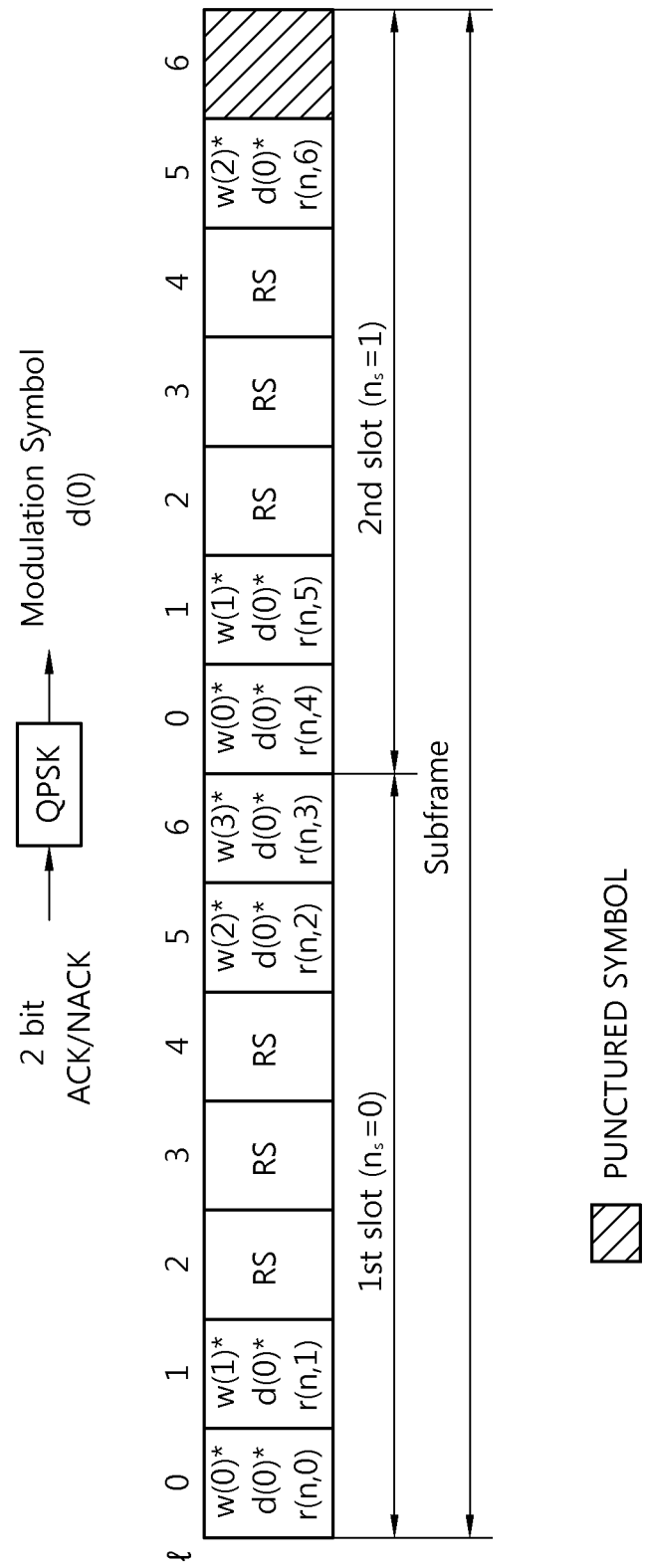
FIG. 11 shows a PUCCH format in which a last SC-FDMA symbol is punctured.

FIG. 11 shows a PUCCH format in which a last SC-FDMA symbol is punctured. In a $1^{st}$ slot, since an ACK/NACK signal is transmitted in 4 SC-FDMA symbols, spreading is performed through a $1^{st}$ orthogonal sequence [w(0), w(1), w(2), w(3)] having a length of 4. In a $2^{nd}$ slot, the ACK/NACK signal is transmitted in 3 SC-FDMA symbols due to a punctured symbol, and thus a $2^{nd}$ orthogonal sequence [w(0), w(1), w(2)] having a length of 3 excluding an element w(3) is used. When the $1^{st}$ orthogonal sequence having a length of 4 of Table 2 is used in the $1^{st}$ slot, [+1, +1, +1], [+1, −1, +1], and [+1, −1, −1] can be respectively used as $2^{nd}$ sequences $w'_0$, $w'_1$, and $w'_2$ having a length of 3. One of the sequences $w'_0$, $w'_1$, and $w'_2$ is selected as the $2^{nd}$ orthogonal sequence in the $2^{nd}$ slot.

However, a cross correlation value of the sequence $w'_0$ and the sequence $w'_1$ is 1, a cross correlation value of the sequence $w'_1$ and the sequence $w'_2$ is 1, and a cross correlation value of the sequence $w'_0$ and the sequence $w'_2$ is −1. Therefore, a Euclidian distance is not constant in each sequence. This may result in performance deterioration in detection of the sequence. By reference, in the sequences $w_0$, $w_1$, and $w_2$ having a length of 4 in Table 2, a cross correlation value of the sequences $w_0$ and $w_1$, the sequences $w_1$ and $w_2$, and the sequences $w_0$ and $w_2$ are respectively, 0, 0 and 0.

The conventional PUCCH structure may not consider a case where any SC-FDMA symbol is punctured, and thus detection performance may deteriorate when a PUCCH is spread with an orthogonal sequence.

In one embodiment, to minimize performance deterioration of the orthogonal sequence, it is proposed to use one orthogonal sequence selected from sequences shown in the following table.

TABLE 4

| Sequence index | [w(0), w(1), w(2), w(3)] |
|---|---|
| 0 | [+1 +1 +1 +1] |
| 1 | [−1 +1 −1 +1] |
| 2 | [+1 −1 −1 +1] |

In the $1^{st}$ sequences $w_0$, $w_1$, and $w_2$ having a length of 4 in the above Table, a cross correlation value of the sequences $w_0$ and $w_1$, the sequences $w_1$ and $w_2$, and the sequences $w_0$ and $w_2$ are respectively 0, 0, and 0. $2^{nd}$ sequences $w'_0$, $w'_1$, and $w'_2$ having a length of 3 obtained by puncturing w(3) are [+1, +1, +1], [−1, +1, −1], and [+1, −1, −1]. The cross correlation value of the sequence $w'_0$ and the sequence $w'_1$ is −1, the cross correlation value of the sequence $w'_1$ and the sequence $w'_2$ is −1, and the cross correlation value of the sequence $w'_0$ and the sequence $w'_2$ is −1, and thus a distance between sequences becomes constant.

In order to generate the $2^{nd}$ orthogonal sequence having a length of 3 from the $1^{st}$ orthogonal sequence having a length of 4 in Table 4, the $2^{nd}$ orthogonal sequence is generated by removing at least one element included in the $1^{st}$ orthogonal sequence. The at least one element to be removed is identical in each index of the $1^{st}$ orthogonal sequence. That is, an element w(3) corresponding to a punctured symbol in each sequence index is identical in the $1^{st}$ orthogonal sequence in Table 4. When the identical element w(3) is removed, the remaining elements can be configured to have a constant cross correlation, so that detection performance of a control signal is increased in a receiver.

In another embodiment, to minimize performance deterioration of an orthogonal sequence, it is proposed to use one orthogonal sequence selected from sequences as shown in the following Table.

TABLE 5

| Sequence index | [w(0), w(1), w(2), w(3)] |
|---|---|
| 0 | [−1 −1 +1 +1] |
| 1 | [−1 +1 −1 +1] |
| 2 | [+1 −1 −1 +1] |

In order to generate the $2^{nd}$ orthogonal sequence having a length of 3 from the $1^{st}$ orthogonal sequence having a length of 4 in Table 5, the $2^{nd}$ orthogonal sequence is generated by removing at least one element included in the $1^{st}$ orthogonal sequence. The at least one element to be removed is identical in each index of the $1^{st}$ orthogonal sequence. That is, an element w(3) corresponding to a punctured symbol in each sequence index is identical in the $1^{st}$ orthogonal sequence in Table 5. When the identical element w(3) is removed, the remaining elements can be configured to have a constant cross correlation, so that detection performance of a control signal is increased in a receiver.

The sequence of Table 4 and Table 5 above can be selectively used only in a subframe in which an SC-FDMA symbol is punctured. In a subframe in which no SC-FDMA symbol is punctured, the orthogonal sequence of Table 2 may be used, and in a subframe in which there is an SC-FDMA symbol to be punctured, the orthogonal sequence of Table 4 or Table 5 may be used.

Although it is proposed in Table 4 and Table 5 above that the existing orthogonal sequence is changed, the sequence of Table 2 may be directly or reversely used in a $1^{st}$ slot in which no SC-FDMA symbol is punctured, and a sequence having a length of 3 may be used as shown in the following Table in a $2^{nd}$ slot in which there is an SC-FDMA symbol to be punctured.

TABLE 6

| Sequence index | [w(0), w(1), w(2)] |
|---|---|
| 0 | [+1 +1 +1] |
| 1 | [−1 +1 −1] |
| 2 | [+1 −1 −1] |

Alternatively, a sequence having a length of 3 as shown in the following Table can be used in the $2^{nd}$ slot in which there is an SC-FDMA symbol to be punctured.

TABLE 7

| Sequence index | [w(0), w(1), w(2)] |
|---|---|
| 0 | [−1 −1 +1] |
| 1 | [−1 +1 −1] |
| 2 | [+1 −1 −1] |

In the proposed Tables, an order of sequences based on each sequence index is for exemplary purposes only, and thus may change. For example, in Table 4, a sequence corresponding to a sequence index 1 may be [+1 −1 −1 +1], and a sequence corresponding to a sequence index 2 may be [−1 +1 −1 +1].

Figure 12:
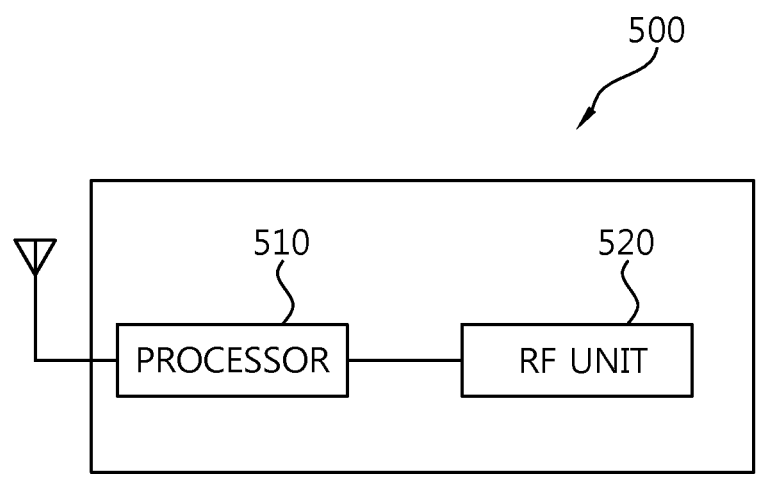
FIG. 12 is a block diagram showing an apparatus for wireless communication for implementing an embodiment of the present invention.

FIG. 12 is a block diagram showing an apparatus for wireless communication for implementing an embodiment of the present invention. The apparatus may be a part of a UE. An apparatus 500 for wireless communication includes a processor 510 and a radio frequency (RF) unit 520. The RF unit 520 is coupled to the processor 510, and transmits and/or receives a radio signal. The processor 510 transmits a UL control signal to a BS. The processor 510 transmits the UL control signal on a PUCCH and by using configuration of a PUCCH according to the aforementioned embodiment.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting a control signal in a subframe comprising a first slot and a second slot in a time domain in a wireless communication system, the method comprising:
   generating a cyclically shifted sequence by cyclically shifting a base sequence by a cyclic shift amount;
   generating a modulated sequence on the basis of a modulation symbol representing the control signal and the cyclically shifted sequence;
   generating a first-spread sequence by spreading the modulated sequence in the first slot by using a first orthogonal sequence;

generating a second-spread sequence by spreading the modulated sequence in the second slot by using a second orthogonal sequence; and transmitting the first spread sequence and the second spread sequence in the subframe, wherein a length of the second orthogonal sequence is shorter than a length of the first orthogonal sequence, the second orthogonal sequence is generated by removing at least one element included in the first orthogonal sequence, and the at least one element to be removed is identical in every index of the first orthogonal sequence, and wherein the length of the first orthogonal sequence is 4, and the length of the second orthogonal sequence is 3.

2. The method of claim 1, wherein the first orthogonal sequence is selected from sequences [+1 +1 +1 +1], [−1 +1 −1 +1], and [+1 −1 −1 +1] each of which has a length of 4, and the second orthogonal sequence is selected from sequences [+1 +1 +1], [−1 +1 −1], and [+1 −1 −1] each of which has a length of 3.

3. The method of claim 1, wherein the first orthogonal sequence is selected from sequences [−1 −1 +1 +1], [−1 +1 −1 +1], and [+1 −1 −1 +1] each of which has a length of 4, and the second orthogonal sequence is selected from sequences [−1 −1 +1], [−1 +1 −1], and [+1 −1 −1] each of which has a length of 3.

4. An apparatus for wireless communication, comprising:
a radio frequency (RF) unit for transmitting a radio signal; and
a processor coupled to the RF unit,
wherein the processor is configured for:
generating a cyclically shifted sequence by cyclically shifting a base sequence by a cyclic shift amount;
generating a modulated sequence on the basis of a modulation symbol representing a control signal and the cyclically shifted sequence;
generating a first-spread sequence by spreading the modulated sequence in a first slot by using a first orthogonal sequence;
generating a second-spread sequence by spreading the modulated sequence in a second slot by using a second orthogonal sequence; and
transmitting the first spread sequence and the second spread sequence in the subframe that includes the first slot and the second slot,
wherein a length of the second orthogonal sequence is shorter than a length of the first orthogonal sequence, the second orthogonal sequence is generated by removing at least one element included in the first orthogonal sequence, and the at least one element to be removed is identical in every index of the first orthogonal sequence, and
wherein the length of the first orthogonal sequence is 4, and the length of the second orthogonal sequence is 3.

\* \* \* \* \*